US012599144B2

(12) United States Patent (10) Patent No.: US 12,599,144 B2

Fuentes Lillo (45) Date of Patent: Apr. 14, 2026

(54) PASTEURIZATION PROCEDURE AND APPARATUS

(71) Applicant: INCUS TECHNOLOGY, S.L., Alicante (ES)

(72) Inventor: Israel Fuentes Lillo, Alicante (ES)

(73) Assignee: INCUS TECHNOLOGY, S.L., Alicante (ES)

( * ) Notice: Subject to any disclaimer, the term of this patent is extended or adjusted under 35 U.S.C. 154(b) by 729 days.

(21) Appl. No.: 16/756,719

(22) PCT Filed: Oct. 17, 2018

(86) PCT No.: PCT/ES2018/070674
§ 371 (c)(1),
(2) Date: Apr. 16, 2020

(87) PCT Pub. No.: WO2019/077186
PCT Pub. Date: Apr. 25, 2019

(65) Prior Publication Data
US 2020/0288734 A1 Sep. 17, 2020

(30) Foreign Application Priority Data

Oct. 17, 2017 (ES) ................................... 201731226

(51) Int. Cl.
| | |
|---|---|
| *A23B 9/02* | (2006.01) |
| *A23B 2/00* | (2025.01) |
| *A23B 2/46* | (2025.01) |
| *A23L 25/00* | (2016.01) |

(52) U.S. Cl.
CPC .............. *A23B 9/025* (2013.01); *A23B 2/003* (2025.01); *A23B 2/465* (2025.01); *A23L 25/20* (2016.08); *A23V 2002/00* (2013.01)

(58) Field of Classification Search
CPC ......... A23B 9/025; A23L 25/20; A23L 3/003; A23L 3/225
See application file for complete search history.

(56) References Cited

U.S. PATENT DOCUMENTS

| | | | | |
|---|---|---|---|---|
| 4,930,230 A | * | 6/1990 | Weckherlen | ........... D21B 1/021 239/110 |
| 2013/0014651 A1 | * | 1/2013 | Roig Borrell | ........... A23L 19/03 99/468 |
| 2015/0010679 A1 | * | 1/2015 | Strong | ...................... A23L 3/06 99/468 |
| 2016/0235109 A1 | | 8/2016 | Cavestro | |

FOREIGN PATENT DOCUMENTS

| | | |
|---|---|---|
| CN | 205305913 U | 6/2016 |
| WO | 2004105518 A1 | 12/2004 |
| WO | 2011073454 A1 | 6/2011 |

OTHER PUBLICATIONS

Derwent Abstract for CN 205305913 U. (Year: 2016).*
ISA/ES, International Search Report and Written Opinion of the International Searching Authority, International Application No. PCT/ES2018/070674, Jan. 8, 2019, 9 pages.
Mikell Knights, "Moving dry food sterilization ahead full-steam," Food Engineering, May 23, 2013, 4 pages. https://www.foodengineeringmag.com/articles/90673-moving-dry-food-sterilization-ahead-fullsteam.

* cited by examiner

*Primary Examiner* — Stephanie A Kohler

(57) ABSTRACT

The present invention relates to an apparatus and a procedure of pasteurization of food, preferably nuts and, particularly, almonds.

2 Claims, 1 Drawing Sheet

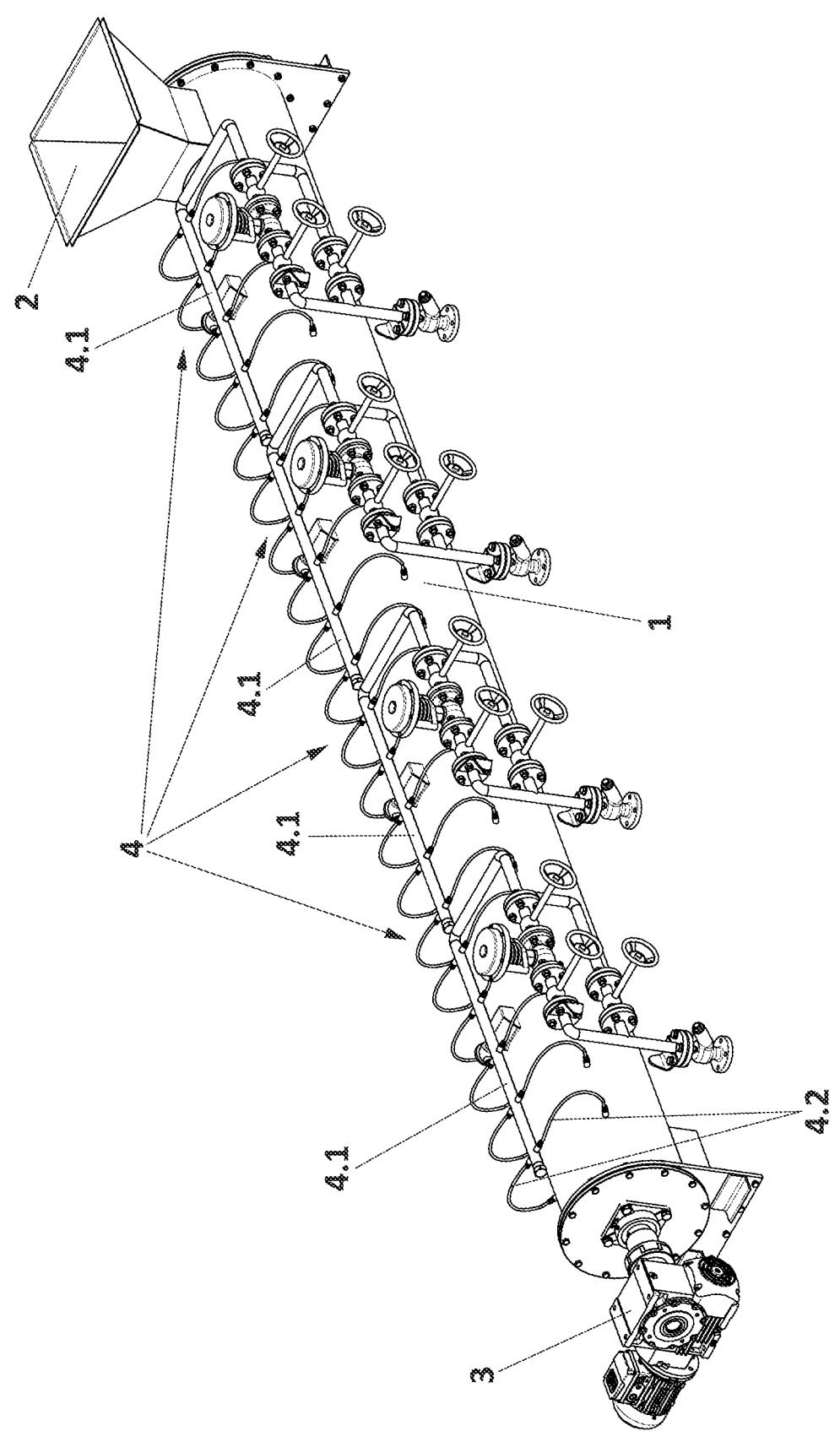

PASTEURIZATION PROCEDURE AND APPARATUS

FIELD OF THE INVENTION

The present invention refers to an apparatus and a procedure of pasteurization of food, preferably nuts and in particular almonds.

STATE OF THE ART

The health and safety of consumers is a priority in today's markets, so the industry together with the departments of agriculture of different countries develops programs of food pasteurization. The purpose of these programs is to make food products safe for consumers and release them from potential risk levels, for example, of becoming ill from consuming bacteria present in these foods. The solutions to these risks must always respect the qualities that the consumer expects from each food product.

Examples of these health problems are the outbreaks of *Salmonella* in 2001 and 2004, which occurred in the United States due to the consumption of almonds. Since then, almonds marketed in the United States must be pasteurized, regardless of whether they are conventionally or organically grown.

There are different methods that allow the destruction of possible bacteria present in food. These include: oil roasting, dry roasting and blanching; steam processing; and processing with propylene oxide (PPO). PPO treatment is a surface treatment where the propylene oxide dissipates quickly after treatment. It is very effective in reducing potential contamination, and does not alter the nutritional and sensory characteristics of the food. This process cannot be used for organic foods.

There are patent documents that describe food pasteurization procedures, such as the Spanish patent with publication number ES2382352 entitled, procedure for the pasteurization and surface sterilization of food portions. In this procedure, in a first stage, the food products are preheated and the treatment is carried out in a humid atmosphere without air. Pasteurization is carried out at temperatures between 55° C. and 99° C. for reduced pressure or sterilization at a temperature between 100° C. and 140° C. for higher sterilization pressure. Steam is introduced through a single lower point, making it difficult to control it during the whole procedure.

Another example is the international patent application with publication number WO2004/105518, which describes a procedure and an apparatus for pasteurizing shelled almonds where the shelled and raw almonds are moved through a saturated steam for an interval of four seconds to raise the outside surface temperature of the almond to a temperature above 71° C. The pasteurized almonds are then dried by a stream of dry air for two seconds before packing. The apparatus where the procedure is carried out includes a kind of interior staircase through which the almonds flow and which is intended to expose most of the surfaces to the steam flow. In the procedure and apparatus of this application there is only one point of entry for the water vapor, so it is difficult for the whole surface of all almonds to reach the same temperature conditions.

It is very important in the process of pasteurization of food to control throughout the procedure the temperature and humidity conditions, if the product absorbs too much water, it may lose its organoleptic quality and have problems in storage due to the development of new pathogens because of the presence of water. A subsequent extreme drying process may also damage the product.

As a consequence, there is a need for an apparatus and a pasteurization procedure capable of controlling the physical conditions during the whole process.

DESCRIPTION OF THE INVENTION

This pasteurization procedure eliminates possible pathogens such as *E. coli* or *Salmonella, Listeria,* viruses, as well as insects, molds and yeasts from food products, preferably nuts or seeds. It is a continuous procedure.

In the present invention, the procedure parameters are constantly monitored so that the minimum amount of steam required to carry out the pasteurization is used, and thus it is also possible to preserve the organoleptic properties. The procedure, being fully automated, reduces the risk of contamination, and additionally it does not consume much energy and is easy to use.

Therefore, the present invention relates to a procedure of pasteurization of food products comprising the steps of (a) introducing the foodstuff through an inlet element that continuously receives the product from a weighing unit, into an elongated body;

(b) recording and controlling the weight per unit of time of product entering;

(c) conveying the foodstuff through the elongated body by means of a motor-driven conveying means;

(d) injecting saturated steam into a first injection area of the elongated body by means of an injection system consisting of a first set of injection points;

(e) injecting saturated steam into a second injection area of the elongated body by means of a second injection system consisting of a second set of injection points;

(f) injecting saturated steam into a third injection area of the elongated body by means of a third injection system consisting of a third set of injection points;

(g) recording and controlling the temperature at the inlet and outlet of the elongated body and recording and controlling the temperature and quantity of steam injected into the injection areas and recording and controlling the speed of the conveying means so that the internal temperature of the elongated body over the entire length is between 85° C. and 100° C.;

(h) collecting the pasteurized product.

In the present invention, saturated steam is understood to be steam whose temperature is equal to the boiling temperature at the existing pressure.

In the present invention pasteurization is understood to be a treatment applied to a food which serves to reduce most microorganisms of public health significance to a level which does not present a risk to public health under normal conditions of storage and distribution.

The inlet element continuously receives the product from a weighing unit to ensure that there are no fluctuations in the inlet flow of the food product.

In the present invention, in addition to the weight per hour of product entering, both the temperature along the elongated body and the speed of the conveying means are controlled, in order to be able to automatically regulate the speed of the conveying means if the internal temperature of the elongated body does not reach a temperature between 85° C. and 100° C. during the time necessary for the pasteurization to occur. The quantities of steam injected after the control stage may vary depending on whether the temperature inside the tube is kept completely stable.

A second aspect of the invention relates to the pasteurization apparatus comprising an elongated body in which the food product is pasteurized and which has: a feeding element, a means of conveying the food product inside the elongated body driven by a motor, at least three injection systems, a record and control system in the injection areas.

BRIEF DESCRIPTION OF THE DRAWINGS

For a better understanding of what has been exhibited, some drawings are included in which, schematically and only as a non-limitative example, a practical case of embodiment is represented.

FIG. 1 shows a perspective view of the pasteurizer.

DETAILED DESCRIPTION OF THE INVENTION

In a particular embodiment of the present invention the pathogens are reduced by four logarithmic units. More particularly, there is a reduction of pathogens by five logarithmic units.

As mentioned above, a second aspect of the invention relates to a pasteurization apparatus comprising an elongated body (1) in which the food product is pasteurized and which has: a feeding element (2), a means of conveying the food product inside the elongated body driven by a motor (3), at least three injection systems (4), a record and control system in the injection areas.

Preferably the food product is a nut or seed. Particularly, the nuts are almonds.

Preferably, the elongated body is a cylindrical body (1). Preferably the feeding element is a hopper (2). Preferably, the conveying element is a motor-driven screw conveyor (3).

Preferably, the injection system consists of a tube (4.1) positioned parallel to the height of the cylinder. Preferably, pairs of steam injectors (4.2) emerge on both sides of the tube, positioned opposite to each other and at a distance of between 100° and 140°.

Particularly, the number of injection systems is 4.

Particularly, from the cylindrical body emerges a water inlet tube with a ball valve for the washing of the interior, preferably located in the product outlet area. Particularly, the cylindrical body has a drain for the evacuation of water and solids.

The invention claimed is:

1. A food pasteurization method comprising the steps of:
   (a) introducing a foodstuff through an inlet of a cylindrical body that continuously receives the foodstuff from a weighing unit into the cylindrical body;
   (b) recording and controlling a weight of the foodstuff entering per unit of time;
   (c) conveying the foodstuff through the cylindrical body by a motor-driven screw conveyor;
   (d) injecting saturated steam into a first injection area of the cylindrical body by an injection system including a first set of injection points, wherein each of the first set of injection points are located opposite to each other and at a distance of between 100° and 140° from a first radial arc which the first set of injection points define;
   (e) injecting saturated steam into a second injection area of the cylindrical body by a second injection system including a second set of injection points, wherein each of the second set of injection points are located opposite each other and at a distance of between 100° and 140° from a second radial arc which the second set of injection points define;
   (f) injecting saturated steam into a third injection area of the cylindrical body by a third injection system including a third set of injection points, wherein each of the third set of injection points are located opposite each other and at a distance of between 100° and 140° from a third radial arc which the third set of injection points define;
   (g) recording and controlling a temperature at the inlet and an outlet of the cylindrical body, recording and controlling a temperature and quantity of steam injected into the first, second, and third injection areas, and recording and controlling a speed of the motor-driven screw conveyor, wherein the quantity of steam injected is minimized to prevent excessive moisture absorption, so that a temperature inside the cylindrical body over an entire distance of the cylindrical body is between 85° C. and 100° C.; and
   (h) collecting a pasteurized foodstuff.

2. The food pasteurization method of claim 1, wherein the foodstuff is a nut or a seed.

* * * * *